US011965551B2

United States Patent
Kamamoto

(10) Patent No.: US 11,965,551 B2
(45) Date of Patent: Apr. 23, 2024

(54) ANGULAR CONTACT BALL BEARING AND BEARING DEVICE FOR VEHICLE WHEEL

(71) Applicant: JTEKT CORPORATION, Kariya (JP)

(72) Inventor: Shigeo Kamamoto, Kashiwara (JP)

(73) Assignee: JTEKT CORPORATION, Kariya (JP)

( * ) Notice: Subject to any disclaimer, the term of this patent is extended or adjusted under 35 U.S.C. 154(b) by 273 days.

(21) Appl. No.: 17/619,269

(22) PCT Filed: Jun. 15, 2020

(86) PCT No.: PCT/JP2020/023436
§ 371 (c)(1),
(2) Date: Dec. 15, 2021

(87) PCT Pub. No.: WO2020/255924
PCT Pub. Date: Dec. 24, 2020

(65) Prior Publication Data
US 2022/0356907 A1   Nov. 10, 2022

(30) Foreign Application Priority Data

Jun. 17, 2019 (JP) ................................ 2019-112093
Jul. 11, 2019 (JP) ................................ 2019-129115
Oct. 16, 2019 (JP) ................................ 2019-189532

(51) Int. Cl.
*F16C 33/41* (2006.01)
*B60B 27/00* (2006.01)
*F16C 19/18* (2006.01)

(52) U.S. Cl.
CPC .......... *F16C 33/418* (2013.01); *F16C 33/414* (2013.01); *B60B 2380/30* (2013.01); *F16C 19/186* (2013.01); *F16C 2326/02* (2013.01)

(58) Field of Classification Search
CPC .............. F16C 33/3806; F16C 33/3887; F16C 33/41–418; F16C 2326/02; F16C 19/186; B60B 27/0005; B60B 2380/30
See application file for complete search history.

(56) References Cited

U.S. PATENT DOCUMENTS

| 3,649,094 A | * | 3/1972 | Russell | F16C 33/3806 |
| | | | | 384/533 |
| 2017/0204901 A1 | * | 7/2017 | Kamamoto | F16C 33/3806 |

(Continued)

FOREIGN PATENT DOCUMENTS

| JP | S49-034843 B1 | 9/1974 |
| JP | S62-004622 U | 1/1987 |

(Continued)

OTHER PUBLICATIONS

Machine Translation of JP-2008115985-A (Year: 2008).*

(Continued)

*Primary Examiner* — Alan B Waits
(74) *Attorney, Agent, or Firm* — Oliff PLC

(57) ABSTRACT

A cage of an angular ball bearing includes, with respect to a plurality of balls arranged between an outer member and an inner member, an annular portion positioned on one side in an axial direction of the angular ball bearing, and a plurality of pillar portions provided to extend from the annular portion to the other side in the axial direction. The pillar portions include a first flat surface portion contactable with the balls on one side in a circumferential direction of the angular ball bearing, and a second flat surface portion contactable with the balls on the other side in the circumferential direction and parallel to the first flat surface portion.

4 Claims, 7 Drawing Sheets

(56) References Cited

U.S. PATENT DOCUMENTS

2018/0223906 A1    8/2018   Kamamoto et al.
2018/0283453 A1   10/2018   Ishii et al.

FOREIGN PATENT DOCUMENTS

| | | | | |
|---|---|---|---|---|
| JP | H07-004439 A | | 1/1995 | |
| JP | 2005-090993 A | | 4/2005 | |
| JP | 2008115985 A | * | 5/2008 | .......... F16C 33/3806 |
| JP | 2010-001908 A | | 1/2010 | |
| JP | 2014-031136 A | | 2/2014 | |
| JP | 2017-129186 A | | 7/2017 | |
| JP | 2017-180722 A | | 10/2017 | |
| JP | 2018-128026 A | | 8/2018 | |
| JP | 2018-173120 A | | 11/2018 | |
| JP | 2019-074098 A | | 5/2019 | |

OTHER PUBLICATIONS

May 9, 2023 Office Action issued in Japanese Patent Application No. 2019-129115.
Mar. 30, 2023 Office Action issued in Japanese Patent Application No. 2019-112093.
Aug. 18, 2020 International Search Report issued in International Patent Application No. PCT/JP2020/023436.
Dec. 21, 2021 International Preliminary Report on Patentability issued in International Patent Application No. PCT/JP2020/023436.

* cited by examiner

ONE SIDE ← AXIAL DIRECTION → OTHER SIDE

ANGULAR CONTACT BALL BEARING AND BEARING DEVICE FOR VEHICLE WHEEL

TECHNICAL FIELD

The present disclosure relates to an angular ball bearing and a wheel bearing apparatus.

BACKGROUND ART

In an automobile, a wheel bearing apparatus (hub unit) is used to support a wheel. The wheel bearing apparatus includes an outer ring fixed to a vehicle body side, an inner shaft member including a flange portion for attaching a wheel, a plurality of balls arranged between the outer ring and the inner shaft member, and a cage including a plurality of pockets that house the balls. The ball is in contact with the outer ring and the inner shaft member at a contact angle. That is, the wheel bearing apparatus includes angular ball bearings. JP2014-031136A discloses a wheel bearing apparatus.

In the wheel bearing apparatus (angular ball bearing) as described above, the balls are housed in the respective pockets of the cage. Accordingly, the cage can hold the plurality of balls at intervals in a circumferential direction. The cage includes an annular portion provided on one side of the balls in an axial direction, and a plurality of pillar portions provided to extend from the annular portion to the other side in the axial direction. A portion between a pair of pillar portions adjacent to each other in the circumferential direction on the other side of the annular portion in the axial direction serves as the pocket for housing the ball.

FIG. 7 is a cross-sectional view of a pillar portion of a cage of related art and surroundings of the pillar portion when viewed along an axial direction. A pocket 90 of a cage 100 has a shape along a cylindrical surface as if the pocket 90 is drilled from a radial direction by a drill. Therefore, a cross-sectional shape of a pillar portion 91 between two balls 99 and 99 adjacent to each other in a circumferential direction is a triangular shape that gradually becomes thinner toward an inner ring 95. A thickness (a dimension in the circumferential direction) of an end portion of the pillar portion 91 on an inner ring 95 side is zero.

In a state where the inner ring 95 is rotated, the ball 99 is in contact with a side surface 92 of the pillar portion 91. In FIG. 7, a center i of pitch circles of a plurality of balls 99 is positioned on a center line of the cage 100. In this state, a contact point of the ball 99 on the side surface 92 is referred to as "p1".

The cage 100 is slightly displaceable in the radial direction between the inner ring 95 and an outer ring 96. When the cage 100 is displaced in the radial direction (the direction toward an upper right side in FIG. 7), the contact point p1 moves toward the inner ring 95 side. In this case, there is a possibility that the ball 99 is in contact with an extremely thin portion of the pillar portion 91.

Particularly, in the wheel bearing apparatus, since a large load acts from a vehicle body side, a road surface side, and the like, the number of balls 99 may be larger than that of a general-purpose ball bearing. Therefore, an interval between the balls 99 and 99 adjacent to each other in the circumferential direction is narrow. Accordingly, the pillar portion 91 is thin. In the cage 100 of such a wheel bearing apparatus, as described above, the cross-sectional shape of the pillar portion 91 is a triangular shape that gradually becomes thinner toward the inner ring 95. Then, when the cage 100 is displaced in the radial direction, there is a possibility that the ball 99 is in contact with the extremely thin portion of the pillar portion 91. That is, in the configuration of the related art, insufficient strength of the pillar portion 91 may cause a problem.

SUMMARY OF INVENTION

The present disclosure provides an angular ball bearing and a wheel bearing apparatus in which a contact portion with a ball in a pillar portion of a cage can be made as thick as possible.

According to an aspect of the present disclosure, an angular ball bearing includes: an outer member; an inner member; a plurality of balls arranged between the outer member and the inner member; and a cage configured to hold the plurality of balls. A virtual straight line that passes through a first contact point between the balls and the outer member and a second contact point between the balls and the inner member is inclined with respect to a virtual plane that is orthogonal to a bearing center line of at least one of the inner member and the outer member and that passes through a center of the balls. The cage includes: an annular portion positioned on one side in an axial direction of the angular ball bearing with respect to the balls; and a plurality of pillar portions provided to extend from the annular portion to the other side in the axial direction. The pillar portions include: a first flat surface portion contactable with the balls on one side in a circumferential direction of the angular ball bearing; and a second flat surface portion contactable with the balls on the other side in the circumferential direction and parallel to the first flat surface.

According to the aspect of the present disclosure, in the angular ball bearing, the first flat surface portion on the one side of the pillar portion in the circumferential direction and the second flat surface portion on the other side of the pillar portion in the circumferential direction are parallel to each other. Even when the cage is displaced in the radial direction, a portion of the pillar portion between the first flat surface portion and the second flat surface portion can be in contact with the ball. That is, in the pillar portion, the ball is not in contact with an extremely thin portion. In the pillar portion, the contact portion with the ball can be made as thick as possible.

According to another aspect of the present disclosure, preferably, the first flat surface portion and the second flat surface portion of the pillar portions are each orthogonal to a virtual line that connects centers of the balls positioned on both sides of the pillar portions in the circumferential direction. With this configuration, the pillar portion includes the first flat surface portion and the second flat surface portion that are parallel to each other.

According to another aspect of the present disclosure, preferably, the pillar portions include: an intermediate portion between the first flat surface portion and the second flat surface portion; an outer portion provided radially outward from the intermediate portion and having a dimension in the circumferential direction larger than that of the intermediate portion; and an inner portion provided radially inward from the intermediate portion and having a dimension in the circumferential direction larger than that of the intermediate portion. With this configuration, the ball is in contact with the intermediate portion of the pillar portion. Further, the pillar portion is further thickened and a strength of the pillar portion is increased from the intermediate portion to a radially outer side portion and a radially inner side portion.

According to another aspect of the present disclosure, preferably, a gap in the circumferential direction formed between the outer portion and the balls and a gap in the circumferential direction formed between the inner portion and the balls are larger than a gap in the circumferential direction formed between the intermediate portion and the balls. With this configuration, the ball is reliably in point contact with the first flat surface portion (the second flat surface portion) of the intermediate portion. The ball is in point contact with the first flat surface portion (the second flat surface portion), so that a contact area between the pillar portion and the ball approaches zero. That is, an area (a shear area) of a surface where lubricant such as grease is sheared between the pillar portion and the ball is reduced as much as possible. Therefore, a shear resistance of the lubricant can be reduced.

According to another aspect of the present disclosure, a wheel bearing apparatus includes: an outer member; an inner member; a plurality of balls arranged between the outer member and the inner member; and a cage configured to hold the plurality of balls. A virtual straight line that passes through a first contact point between the balls and the outer member and a second contact point between the balls and the inner member is inclined with respect to a virtual plane that is orthogonal to a bearing center line of at least one of the inner member and the outer member and that passes through a center of the balls. The cage includes: an annular portion positioned on one side in an axial direction of the wheel bearing apparatus with respect to the balls; and a plurality of pillar portions provided to extend from the annular portion to the other side in the axial direction. The pillar portions include: a first flat surface portion contactable with the balls on one side in a circumferential direction of the wheel bearing apparatus, and a second flat surface portion contactable with the balls on the other side in the circumferential direction and parallel to the first flat surface.

According to the wheel bearing apparatus, the first flat surface portion on the one side of the pillar portion in the circumferential direction and the second flat surface portion on the other side of the pillar portion in the circumferential direction are parallel to each other. Even when the cage is displaced in the radial direction, a portion between the first flat surface portion and the second flat surface portion can be in contact with the ball. That is, in the pillar portion, the ball is not in contact with an extremely thin portion. In the pillar portion, the contact portion with the ball can be made as thick as possible.

DESCRIPTION OF EMBODIMENTS

[Overall Configuration of Wheel Bearing Apparatus]

Figure 1:
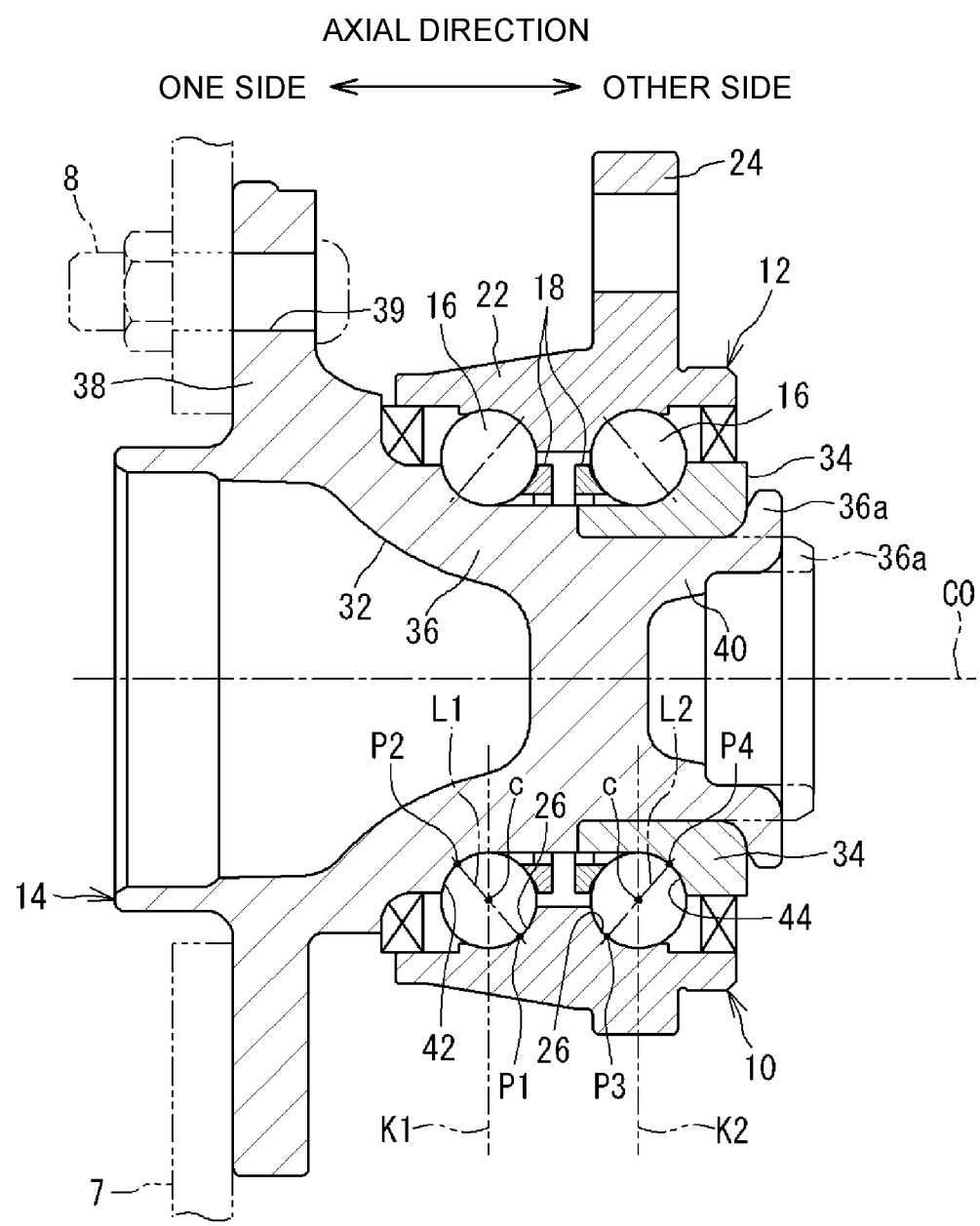
FIG. 1 is a cross-sectional view showing an example of a wheel bearing apparatus.

FIG. 1 is a cross-sectional view showing an example of a wheel bearing apparatus. A wheel bearing apparatus 10 (hereinafter, also referred to as "bearing apparatus 10") shown in FIG. 1 is attached to a suspension apparatus (knuckle) provided in a vehicle body of a vehicle (automobile), and rotatably supports a wheel 7. The bearing apparatus 10 is also referred to as a hub unit. In a state where the bearing apparatus 10 is attached to a vehicle body side (suspension apparatus), a left side in FIG. 1 is a wheel 7 side, and is referred to as a vehicle outer side. A right side in FIG. 1 is a vehicle body center side, and is referred to as a vehicle inner side.

In the bearing apparatus 10 of the present disclosure, a direction along a center line C0 of the bearing apparatus 10 is defined as an "axial direction". The center line C0 of the bearing apparatus 10 is referred to as a "bearing center line C0". The axial direction also includes a direction parallel to the bearing center line C0. In the bearing apparatus 10 of the present disclosure, the vehicle outer side is one side in the axial direction, and the vehicle inner side is the other side in the axial direction. A direction orthogonal to the bearing center line C0 is defined as a "radial direction". A rotation direction of the bearing apparatus 10 about the bearing center line C0 is defined as a "circumferential direction".

The bearing apparatus 10 includes an outer ring 12 (also referred to as an outer ring member or an outer member), an inner shaft member (also referred to as an inner member) 14, a plurality of balls 16 provided between the outer ring 12 and the inner shaft member 14, and annular cages 18 that hold the plurality of balls 16.

The outer ring 12 includes an outer ring main body portion 22 having a cylindrical shape, and a fixing flange portion 24 provided to extend radially outward from the outer ring main body portion 22. Outer raceway surfaces 26 are formed on one side and the other side in the axial direction of an inner periphery of the outer ring main body portion 22. The outer raceway surface 26 has a concave arc surface shape having a radius slightly larger than that of the ball 16 in a cross section including the bearing center line C0. The ball 16 and the outer raceway surface 26 are in point contact with each other. The flange portion 24 is attached to the suspension apparatus (not shown) that is a vehicle body side member. Accordingly, the bearing apparatus 10 including the outer ring 12 is fixed to the vehicle body.

The inner shaft member 14 includes a shaft-shaped hub shaft 32 (inner shaft) and an inner ring 34 fixed to the other side of the hub shaft 32 in the axial direction. The hub shaft 32 includes a shaft main body portion 36 provided radially inward of the outer ring 12, and a flange portion 38. The shaft main body portion 36 is a portion long in the axial direction. The flange portion 38 is provided to extend radially outward from one side of the shaft main body portion 36 in the axial direction. A bolt hole 39 is formed in the flange portion 38. The wheel 7 is fixed to the flange portion 38 by a bolt 8 attached to the bolt hole 39. The inner ring 34 is an annular member, and is externally fitted and fixed to a part 40 of the shaft main body portion 36 on the other side in the axial direction.

A shaft raceway surface 42 is formed on an outer peripheral side of the shaft main body portion 36, and an inner ring raceway surface 44 is formed on an outer peripheral surface of the inner ring 34. The plurality of balls 16 are provided between the outer raceway surface 26 on the one side in the axial direction and the shaft raceway surface 42. The plurality of balls 16 are provided between the outer raceway surface 26 on the other side in the axial direction and the inner ring raceway surface 44. Each of the shaft raceway surface 42 and the inner ring raceway surface 44 has a concave arc surface shape having a radius slightly larger than that of the ball 16 in a cross section including the bearing center line C0. The balls 16 are in point contact with the shaft raceway surface 42, and the balls 16 are in point contact with the inner ring raceway surface 44.

Regarding a row of the plurality of balls 16 arranged on the one side in the axial direction, a contact point between each ball 16 and the outer raceway surface 26 is defined as "P1", a contact point between the ball 16 and the shaft raceway surface 42 is defined as "P2", and a virtual straight line that passes through the contact point P1 and the contact point P2 is defined as "L1". The virtual straight line L1 is inclined with respect to a virtual plane K1 that is orthogonal to the bearing center line C0 and passes through a center c of the ball 16. That is, on the one side in the axial direction, the balls 16 are in contact with the outer raceway surface 26 and the shaft raceway surface 42 at a contact angle. The contact angle is an angle formed by the virtual straight line L1 and the virtual plane K1. In the row of the plurality of balls 16 on the one side in the axial direction, the angular ball bearing includes the plurality of balls 16, the outer ring 12 having the outer raceway surface 26, and the inner shaft member 14 having the shaft raceway surface 42, which are described above.

Regarding a row of the plurality of balls 16 arranged on the other side in the axial direction, a contact point between each ball 16 and the outer raceway surface 26 is defined as "P3", a contact point between the ball 16 and the inner ring raceway surface 44 is defined as "P4", and a virtual straight line that passes through the contact point P3 and the contact point P4 is defined as "L2". The virtual straight line L2 is inclined with respect to a virtual plane K2 that is orthogonal to the bearing center line C0 and passes through the center c of the ball 16. That is, on the other side in the axial direction, the balls 16 are in contact with the outer raceway surface 26 and the inner ring raceway surface 44 at a contact angle. The contact angle is an angle formed by the virtual straight line L2 and the virtual plane K2. In the row of the plurality of balls 16 on the other side in the axial direction, the angular ball bearing includes the plurality of balls 16, the outer ring 12 having the outer raceway surface 26, and the inner shaft member 14 including the inner ring 34 having the inner ring raceway surface 44, which are described above.

In the row of the balls 16 on the one side in the axial direction and in the row of the balls 16 on the other side in the axial direction, the plurality of balls 16 are held by the cages 18. As described above, the inner shaft member 14 is rotated about the bearing center line C0 with respect to the outer ring 12. The cage 18 on the one side in the axial direction and the cage 18 on the other side in the axial direction are attached in opposite directions to each other in the axial direction, but configurations of these cages 18 are the same. Hereinafter, configurations of the cage 18 on the other side in the axial direction that is the vehicle inner side, and surroundings thereof will be described.

[Cage 18]

Figure 2:
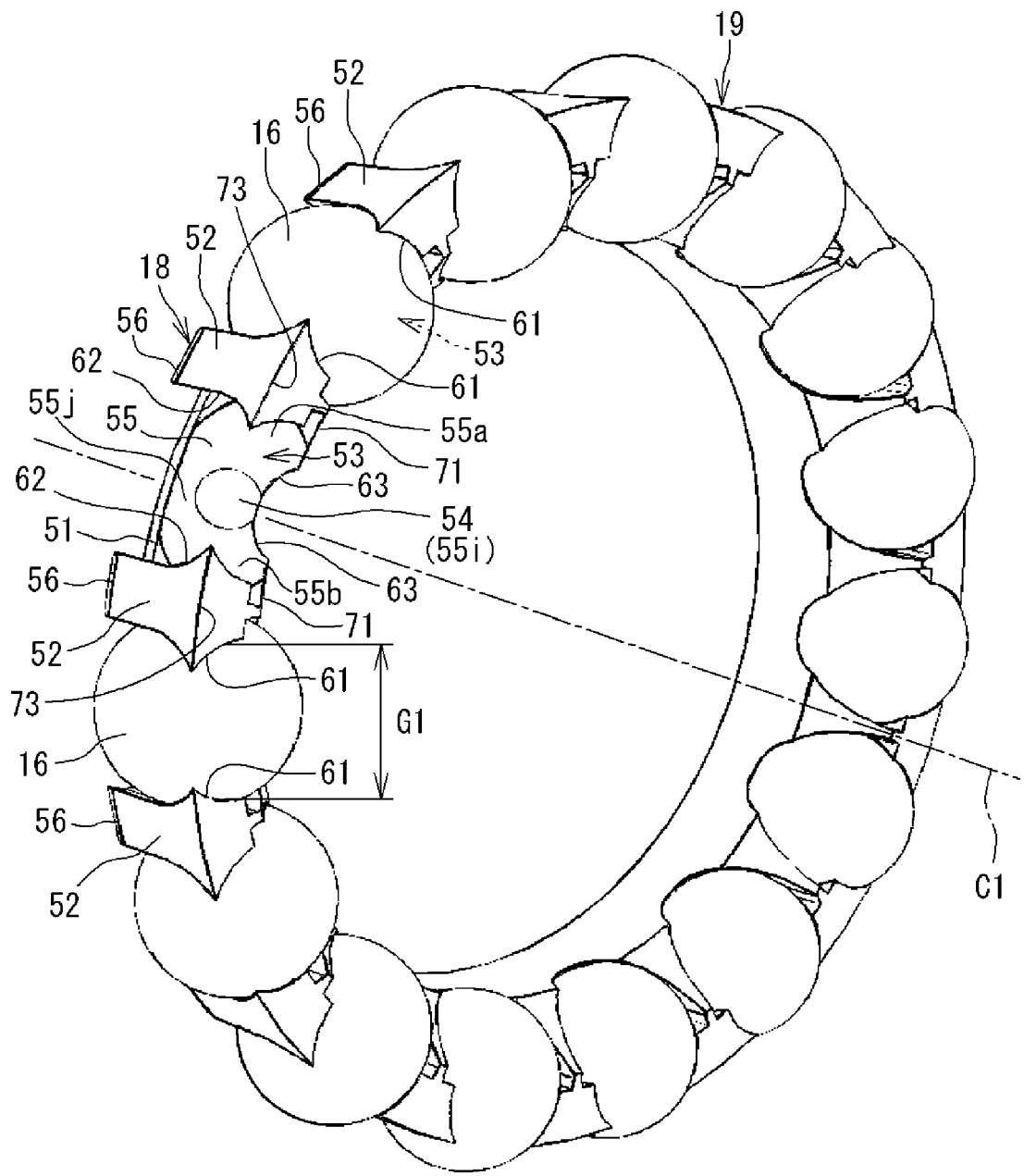
FIG. 2 is a perspective view of balls and a cage.
Figure 3:
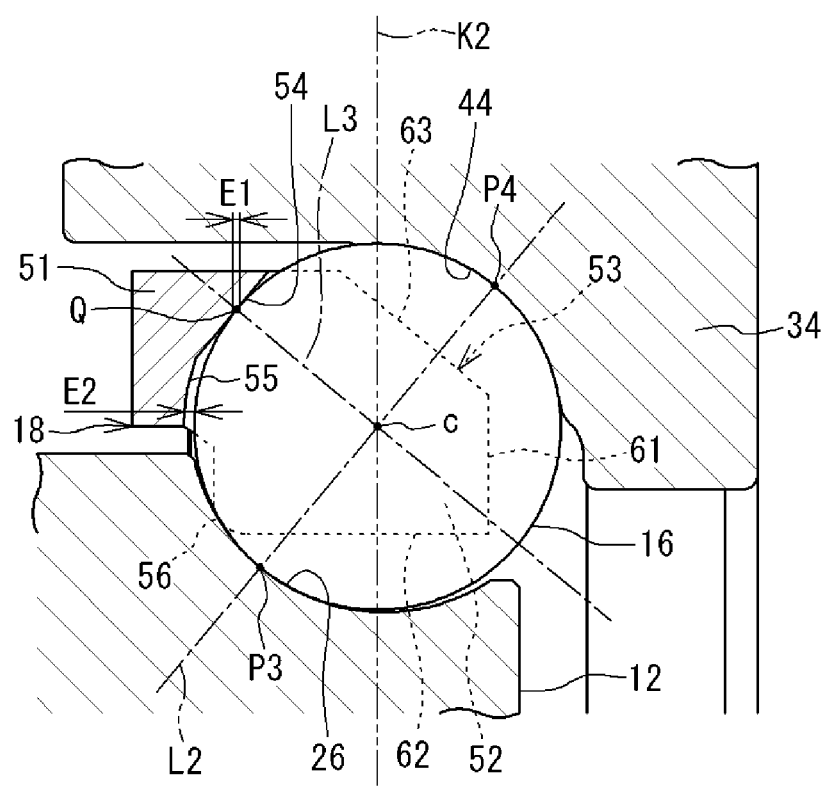
FIG. 3 is a cross-sectional view taken along a plane that includes a center line of the cage and passes through a center of the ball.

FIG. 2 is a perspective view of the balls 16 and the cage 18. FIG. 2 shows a state where one ball 16 on a left side is removed from the cage 18 for the sake of explanation. FIG. 3 is a cross-sectional view taken along a plane that includes a center line C1 of the cage 18 and passes through the center c of the ball 16. In FIG. 3, the ball 16 is not shown as a cross section. In the present disclosure, the center line C1 of the cage 18 coincides with the bearing center line C0 in a state where the cage 18 that holds the balls 16 is provided between the outer ring 12 and the inner shaft member 14, unless otherwise specified.

The cage 18 includes an annular portion 51 having an annular shape and a plurality of pillar portions 52. The annular portion 51 is positioned on one side in the axial direction of the plurality of balls 16. Each pillar portion 52 is provided to extend from the annular portion 51 to the other side in the axial direction. The plurality of pillar portions 52 are arranged at equal intervals in the circumferential direction. A pocket 53 for housing the ball 16 is formed between a pair of pillar portions 52 and 52 adjacent to each other in the circumferential direction on the other side of the annular portion 51 in the axial direction.

As described above, the ball 16 is in point contact with the outer ring 12 and the inner ring 34 (see FIG. 3), and is immovable in the axial direction and the radial direction with respect to the outer ring 12 and the inner ring 34. Since a gap is formed between the ball 16 and the pocket 53 as a whole, the cage 18 can be displaced in the axial direction and the radial direction with respect to the ball 16.

When the bearing apparatus 10 (the inner shaft member 14) is rotated, the ball 16 is rotated (revolved) along the outer ring 12 and the inner shaft member 14, and the ball 16 is rotated (spun) around a rotation center line L3 in the pocket 53. The rotation center line L3 is orthogonal to the virtual straight line L2 that passes through the contact point P3 between the ball 16 and the outer raceway surface 26 and the contact point P4 between the ball 16 and the inner ring raceway surface 44.

Figure 4:
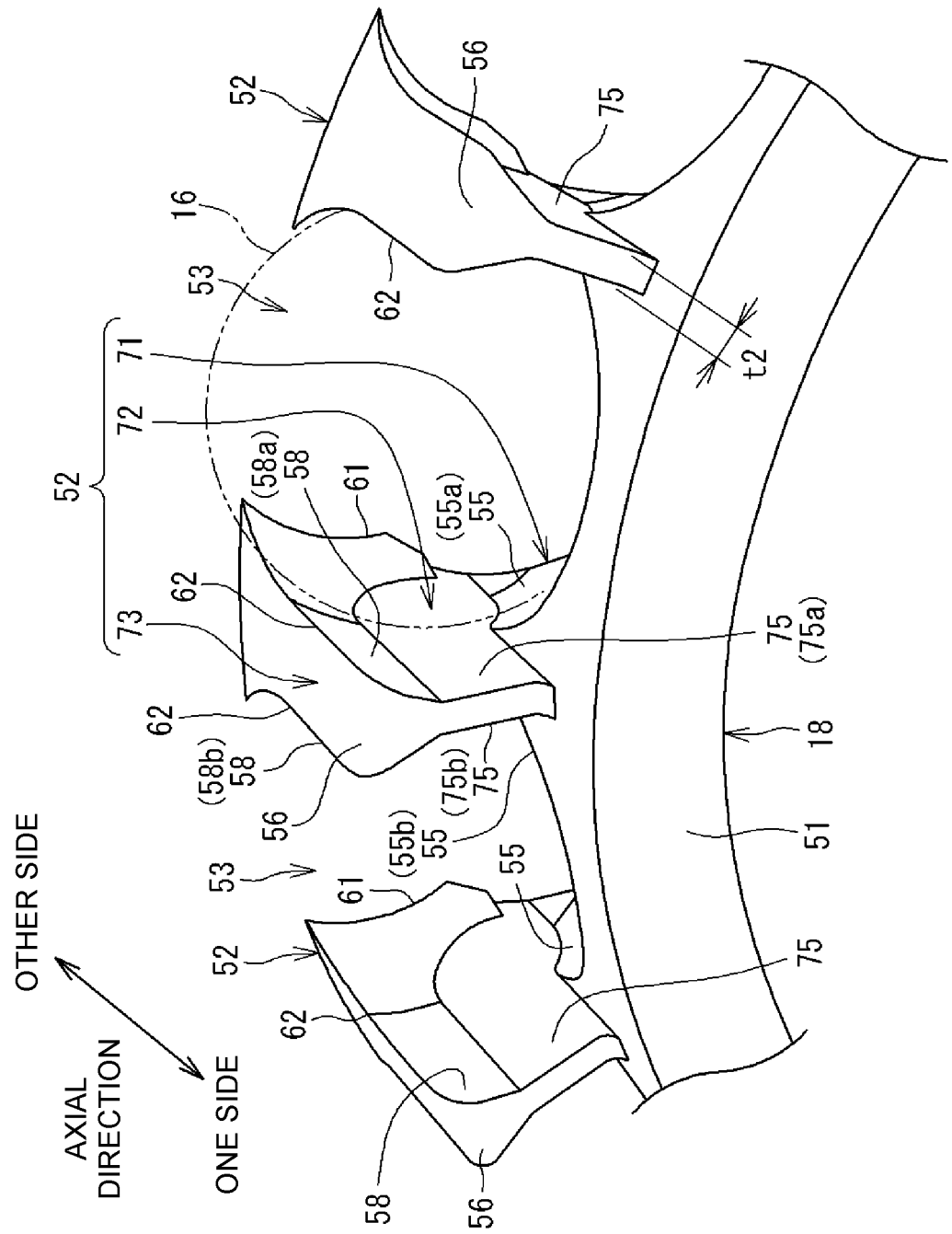
FIG. 4 is a perspective view of a part of the cage when viewed from one side in an axial direction.

FIG. 4 is a perspective view of a part of the cage 18 when viewed from the one side in the axial direction. The pillar portion 52 is provided to extend from the annular portion 51 to the other side in the axial direction, and is also provided to extend radially outward. The pillar portion 52 includes an inner portion 71, an intermediate portion 72, and an outer portion 73 in this order from a radially inner side. The inner portion 71 is a portion that protrudes from the annular portion 51 toward the other side in the axial direction. The intermediate portion 72 is a portion provided to extend radially outward from the inner portion 71. The outer portion 73 is a portion provided to extend further radially outward from the intermediate portion 72. The intermediate portion 72 and the outer portion 73 of the pillar portion 52 are portions that protrude radially outward from the annular portion 51.

The inner portion 71 includes a part of a non-contact surface portion 55 that is not in contact with the ball 16 on both sides in the circumferential direction (see FIGS. 2 and 4). The non-contact surface portion 55 is also referred to as the "inner non-contact surface portion 55". Regarding the non-contact surface portion 55, a part of the non-contact surface portion 55 on one side of the inner portion 71 in the circumferential direction is defined as a "first non-contact surface portion 55a", and a part of the non-contact surface portion 55 on the other side of the inner portion 71 in the circumferential direction is defined as a "second non-contact surface portion 55b". The non-contact surface portion 55 will be described later.

The outer portion 73 includes non-contact surface portions 58 that are not in contact with the balls 16 respectively on both sides in the circumferential direction (see FIG. 4). The non-contact surface portion 58 of the outer portion 73 is also referred to as the "outer non-contact surface portion 58". Between the non-contact surface portions 58 on both sides of the outer portion 73 in the circumferential direction, the non-contact surface portion 58 on the one side is defined as a "first non-contact surface portion 58a", and the non-contact surface portion 58 on the other side is defined as a "second non-contact surface portion 58b". The non-contact surface portion 58 will be described later.

The intermediate portion 72 includes flat surface portions 75 respectively on both sides in the circumferential direction. The flat surface portion 75 is a surface that can be in contact with the ball 16. The flat surface portion 75 of the intermediate portion 72 is also referred to as an "outer contact surface portion". Between the flat surface portions 75 on both sides of the intermediate portion 72 in the circumferential direction, the flat surface portion 75 on one side is defined as a "first flat surface portion 75a", and the flat surface portion 75 on the other side is defined as a "second flat surface portion 75b".

Figure 5:
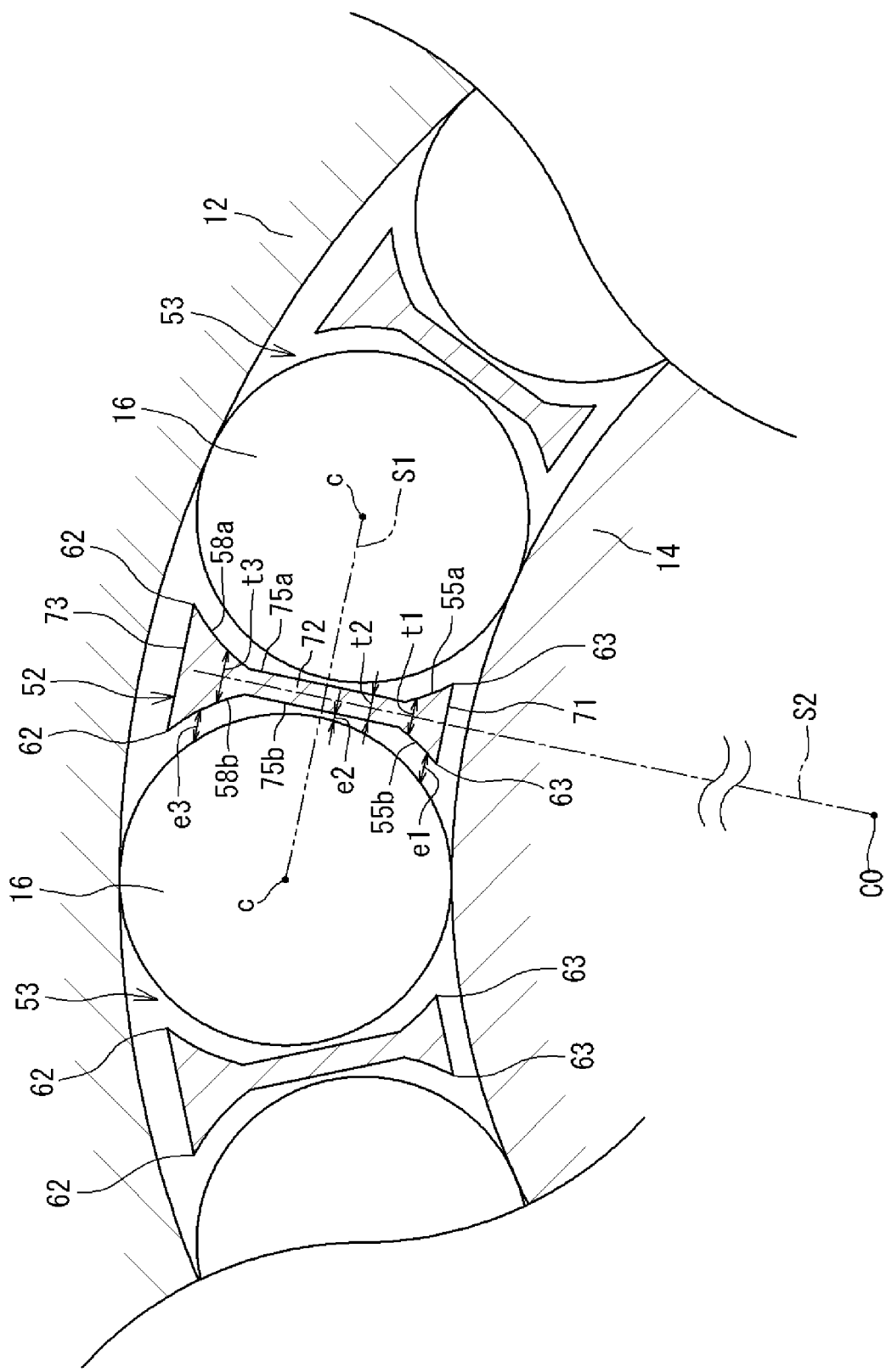
FIG. 5 is a cross-sectional view of a pillar portion and surroundings thereof when viewed along the axial direction.

FIG. 5 is a view for illustrating the inner portion 71, the intermediate portion 72, and the outer portion 73, and is a cross-sectional view of the pillar portion 52 and surroundings thereof when viewed along the axial direction. In each pillar portion 52, the first flat surface portion 75a and the second flat surface portion 75b are parallel to each other. Therefore, a dimension in the circumferential direction of the intermediate portion 72 (that is, a thickness t2 of the intermediate portion 72) is constant from a radially inner side to a radially outer side of the intermediate portion 72. Further, the dimension in the circumferential direction (thickness t2) of the intermediate portion 72 is constant from the one side in the axial direction to the other side in the axial direction of the intermediate portion 72 except for a part thereof. The part is an axial retention portion 61 (see FIG. 4). The axial retention portion 61 is provided on the other side in the axial direction from the intermediate portion 72 to the outer portion 73. The axial retention portion 61 will be described later.

As described above, the inner portion 71 includes a part of the non-contact surface portion 55 having a shape along a spherical surface having a diameter larger than that of the ball 16. Therefore, a dimension in the circumferential direction of the inner portion 71 (that is, a thickness t1 of the inner portion 71) is larger than the dimension in the circumferential direction (the thickness t2) of the intermediate portion 72. As described above, the outer portion 73 includes the pair of non-contact surface portions 58a and 58b on both sides in the circumferential direction. An interval between the non-contact surface portions 58a and 58b in the circumferential direction increases toward a radially outer side. Therefore, a dimension in the circumferential direction of the outer portion 73 (that is, a thickness t3 of the outer portion 73) is larger than the dimension in the circumferential direction (the thickness t2) of the intermediate portion 72.

A gap e3 in the circumferential direction formed between the outer portion 73 and the ball 16 is larger than a gap e2 in the circumferential direction formed between the intermediate portion 72 and the ball 16. Further, a gap e1 in the circumferential direction formed between the inner portion 71 and the ball 16 is larger than the gap e2 in the circumferential direction formed between the intermediate portion 72 and the ball 16. Accordingly, the ball 16 can be reliably in contact with the first flat surface portion 75a (second flat surface portion 75b) of the intermediate portion 72.

Each of the first flat surface portion 75a and the second flat surface portion 75b of the pillar portion 52 is orthogonal to a virtual line S1 that connects centers c of the balls 16 and 16 positioned on both sides of the pillar portion 52 in the circumferential direction. Accordingly, the first flat surface portion 75a and the second flat surface portion 75b are parallel to each other. In a state where the center line of the cage 18 coincides with the bearing center line C0, a center line S2 between the first flat surface portion 75a and the second flat surface portion 75b of one pillar portion 52 intersects the bearing center line C0.

In the pillar portion 52 including the inner portion 71, the intermediate portion 72, and the outer portion 73, the intermediate portion 72 is a portion having a smallest dimension in the circumferential direction (thickness). The first flat surface portion 75a and the second flat surface portion 75b of the intermediate portion 72 are parallel to each other.

Figure 7:
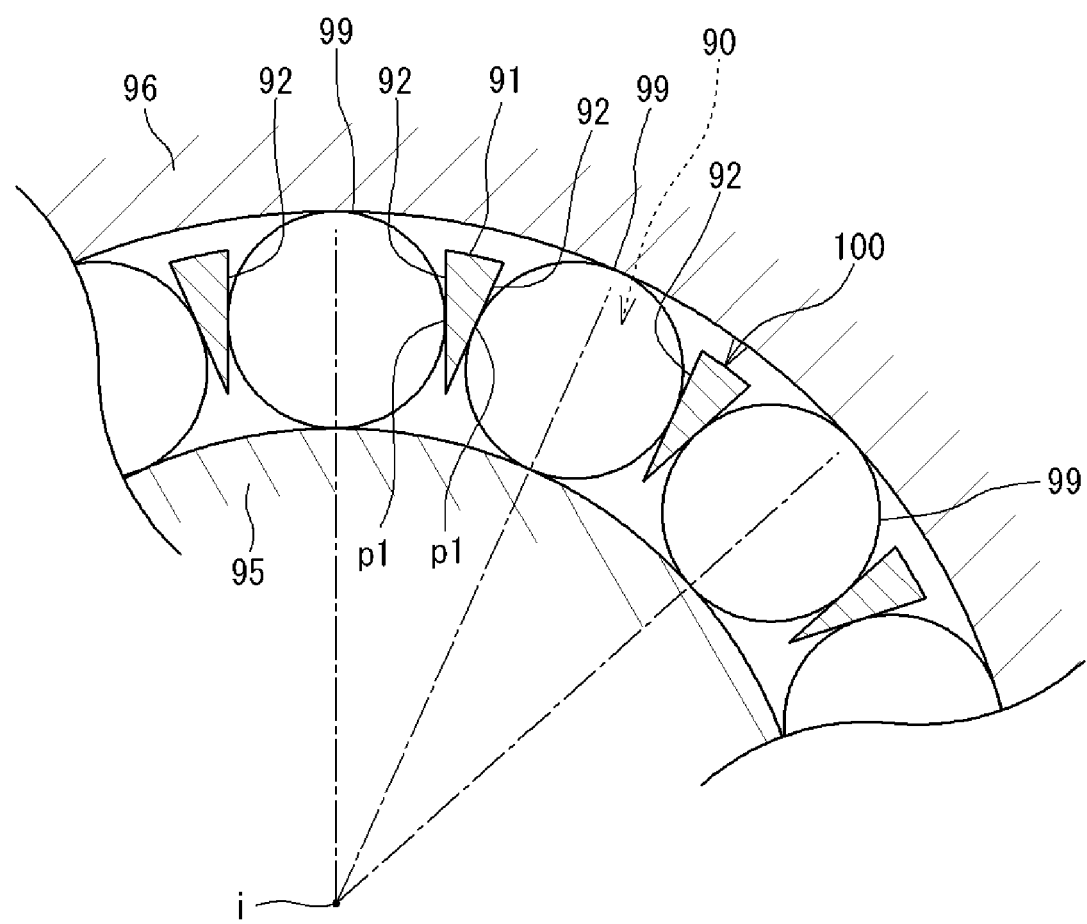
FIG. 7 is a cross-sectional view of a pillar portion of a cage of related art and surroundings of the pillar portion when viewed along an axial direction.

Here, in the related art (see FIG. 7), a pillar portion 91 has a triangular cross section. Therefore, a ball 99 may be in contact with an extremely thin portion of the pillar portion 91, and the portion becomes a weak point in terms of strength.

However, according to the configuration described with reference to FIG. 5, such a weak point is unlikely to occur. That is, when the intermediate portion 72 is set to have the dimension in the circumferential direction (thickness t2) required in terms of strength, the intermediate portion 72 is unlikely to become a weak point.

[Pocket 53 of Cage 18]

As shown in FIG. 2, the pocket 53 includes a contact surface portion 54 and the non-contact surface portion 55. The contact surface portion 54 is one portion 55i of a surface of the annular portion 51 on the other side in the axial direction, and is also referred to as the "inner contact surface portion 54". As described above, the non-contact surface portion 55 is also referred to as the inner non-contact surface portion 55. The non-contact surface portion 55 is disposed adjacent to the contact surface portion 54 and is provided around the contact surface portion 54. The non-contact surface portion 55 includes the other portion 55j of the surface of the annular portion 51 on the other side in the axial direction, the first non-contact surface portion 55a of the inner portion 71 of one pillar portion 52, and the second non-contact surface portion 55b of the inner portion 71 of the other pillar portion 52.

In FIG. 3, when the cage 18 is displaced toward the other side in the axial direction, the inner contact surface portion 54 is in point contact with the ball 16 at a point Q on the rotation center line L3 of the ball 16. The inner contact surface portion 54 is formed by a plane orthogonal to the rotation center line L3. The inner non-contact surface portion 55 has a shape along a spherical surface having a diameter larger than that of the ball 16.

A center of the spherical surface that forms the inner non-contact surface portion 55 is defined as a "center of the pocket 53". In a state where the center c of the ball 16 and the center of the pocket 53 coincide with each other, a gap is formed between the pocket 53 and the ball 16 as a whole. Therefore, the cage 18 can be displaced in the axial direction and the radial direction with respect to the ball 16. However, as will be described later, the displacement is limited by the inner contact surface portion 54 and a guide portion 56. In a state where the center c of the ball 16 and the center of the pocket 53 coincide with each other, a gap (a gap at the point Q) generated between the inner contact surface portion 54 and the ball 16 is smaller than a gap generated between the inner non-contact surface portion 55 and the ball 16. The gap will be further described.

In the present disclosure, a state where the center of the pocket 53 and the center c of the ball 16 coincide with each other is referred to as a center coinciding state. As shown in FIG. 3, in the center coinciding state, a clearance E1 in the axial direction at a contact position (point Q) between the inner contact surface portion 54 and the ball 16 is smaller than a minimum value of a clearance E2 in the axial direction formed between the ball 16 and the inner non-contact surface portion 55 (E1<E2 min). Therefore, when the cage 18 is displaced toward the other side in the axial direction, the inner contact surface portion 54 is in point contact with the ball 16 before the inner non-contact surface portion 55 is in contact with the ball 16, and the ball 16 and the inner non-contact surface portion 55 is not in contact with each other. That is, the inner non-contact surface portion 55 cannot be in contact with the ball 16 even when the cage 18 is displaced toward the other side in the axial direction.

A shape of the pocket 53 will be further described. In FIG. 4, each pillar portion 52 includes the flat surface portions 75 (the first flat surface portion 75a and the second flat surface portion 75b) and the inner and outer non-contact surface portions 55 and 58 provided adjacent to the flat surface portions 75 as side surfaces provided in the pocket 53 and oriented in the circumferential direction.

In the present disclosure, the outer non-contact surface portion 58 is provided adjacent to a radially outer side of the flat surface portion 75, and the inner non-contact surface portion 55 is provided adjacent to a radially inner side of the flat surface portion 75. The flat surface portion 75 is configured with a flat surface. The flat surface portion 75 is a surface that can be in point contact with the ball 16 as described above. The outer non-contact surface portion 58 is a surface that cannot be in contact with the ball 16. The inner non-contact surface portion 55 is also a surface that cannot be in contact with the ball 16.

When the bearing apparatus 10 (the inner shaft member 14) is rotated, the ball 16 advances in the circumferential direction and is in contact with the pillar portions 52. At this time, the ball 16 is in point contact with the flat surface portions 75, and is not in contact with the non-contact surface portions 55 and 58. A mode in which the ball 16 is in contact with the flat surface portions 75 is point contact. Therefore, a shear area of grease at a contact position can be reduced as much as possible.

[Guide Portion 56 of Cage 18]

Figure 6:
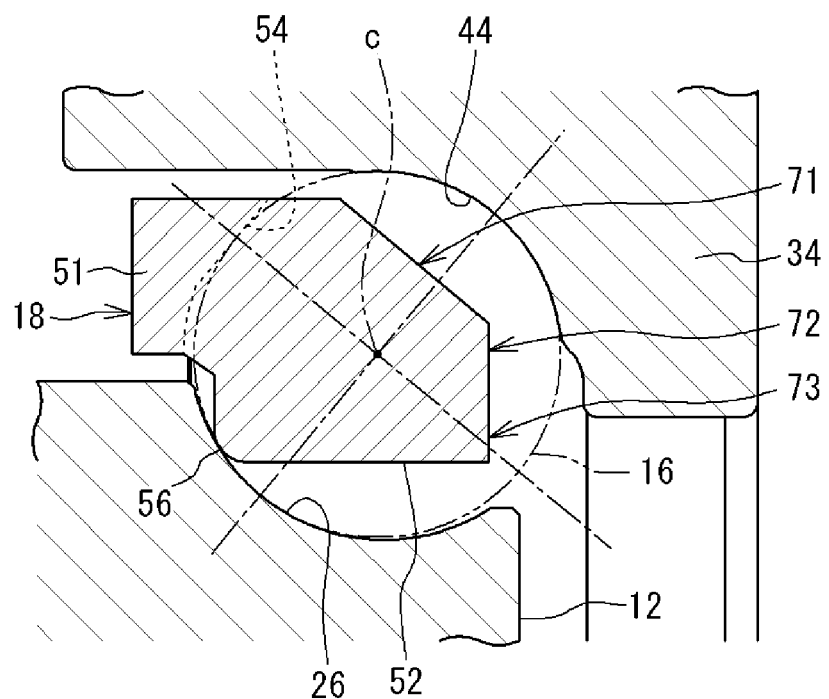
FIG. 6 is a cross-sectional view taken along a plane that includes the center line of the cage and passes through the pillar portion.

FIG. 6 is a cross-sectional view taken along a plane that includes the center line C1 (see FIG. 2) of the cage 18 and passes through the pillar portion 52. The pillar portion 52 of the present disclosure is provided to extend in the axial direction from the annular portion 51, and is provided to extend toward an outer ring 12 side (radially outer side). An outer portion 73, which is a portion of the pillar portion 52 on a radially outer side, includes the guide portion 56 that can be in contact with the outer ring 12. The guide portion 56 has a function of positioning the cage 18.

The guide portion 56 can be in contact with the outer raceway surface 26, which is a part of the outer ring 12, from the radial direction. A shape of the guide portion 56 is set such that the guide portion 56 and the outer raceway surface 26 are in point contact with each other. When the cage 18 is displaced toward the outer ring 12 side, the guide portion 56 is in contact with the outer raceway surface 26 from the radial direction. Accordingly, the cage 18 is positioned in the radial direction by the outer ring 12. Such a cage 18 of the present disclosure is referred to as a "bearing ring guide cage".

In this way, the guide portion 56 has a function of positioning the cage 18 in the radial direction. The guide portion 56 of the present disclosure further has a function of positioning the cage 18 in the axial direction. That is, in FIG. 6, when the cage 18 is displaced to one side in the axial direction, the guide portion 56 is in contact with the outer raceway surface 26 from the axial direction, so that the displacement of the cage 18 to the one side in the axial direction is restricted. A shape of the guide portion 56 is set such that the guide portion 56 and the outer raceway surface 26 are in point contact with each other. On the contrary, when the cage 18 is displaced toward the other side in the axial direction, the inner contact surface portion 54 of the pocket 53 is in point contact with the ball 16 in FIG. 3, so that the displacement of the cage 18 toward the other side in the axial direction is restricted.

[Function of Cage 18 to Prevent Ball 16 from Falling Off]

The bearing apparatus 10 shown in FIG. 1 is assembled as follows. First, the balls 16 are housed in the pockets 53 of the single cage 18 to give units 19 (see FIG. 2) of the cage 18. Two units 19 of the cage 18 are assembled. One unit 19 is attached to the outer ring 12 together with the shaft main body portion 36 from the one side in the axial direction. Another unit 19 is attached to the outer ring 12 and the shaft main body portion 36 together with the inner ring 34 from the other side of the outer ring 12 in the axial direction. The inner ring 34 is fixed to the shaft main body portion 36 by plastically deforming an end portion 36a of the shaft main body portion 36. The bearing apparatus 10 is assembled as described above.

In a state of the units 19 shown in FIG. 2, the cage 18 includes portions that prevent the balls 16 from falling off such that the balls 16 do not fall off from the pockets 53. That is, the cage 18 includes the axial retention portions 61 that prevent the balls 16 housed in the pockets 53 from falling off to the other side in the axial direction. The axial retention portion 61 is provided at an end portion of the pillar portion 52 on the other side in the axial direction. An interval G1 between the axial retention portions 61 and 61 on both sides of the pocket 53 in the circumferential direction is smaller than a diameter of the ball 16 housed in the pocket 53. Therefore, the ball 16 does not fall off from the pocket 53 in the axial direction.

Further, as shown in FIG. 2, the cage 18 includes outer radial retention portions 62 that prevent the balls 16 housed in the pockets 53 from falling off radially outward, and inner radial retention portions 63 that prevent the balls 16 from falling off radially inward. The outer radial retention portion 62 is provided at an end portion of the pillar portion 52 on the radially outer side. That is, the outer radial retention portion 62 is included in the outer portion 73 of the pillar portion 52. The inner radial retention portion 63 is provided at an end portion of the pillar portion 52 on the radially inner side. That is, the inner radial retention portion 63 is included in the inner portion 71 of the pillar portion 52.

An interval between the outer radial retention portions 62 and 62 on both sides of the pocket 53 in the circumferential direction is smaller than the diameter of the ball 16 housed in one pocket 53. Therefore, the ball 16 does not fall off from the pocket 53 to the radially outer side. Further, an interval between the inner radial retention portions 63 and 63 on both sides of the pocket 53 in the circumferential direction is smaller than the diameter of the ball 16 housed in one pocket 53. Therefore, the ball 16 does not fall off from the pocket 53 radially inward. In order to house the ball 16 in the pocket 53, in a case of the present disclosure, the ball 16 is pushed into the pocket 53 from an outer peripheral side of the cage 18, and at this time, the outer radial retention portions 63 and 63 are elastically deformed.

A state (a state shown in FIG. 2) where the balls 16 are housed in the pockets 53 and before the cages 18 are attached between the outer ring 12 and the inner ring 34 (the shaft main body portion 36) is referred to as a "pre-attachment unit state". On the contrary, a state where the balls 16 are housed in the pockets 53 and the cages 18 are attached between the outer ring 12 and the inner ring 34 (the shaft main body portion 36) (a state shown in FIG. 1) is referred to as an "assembled state after attachment".

In the pre-attachment unit state shown in FIG. 2, the ball 16 can be in contact with the axial retention portions 61 and 61 in order to prevent the ball 16 from falling off the cage 18. On the contrary, in the assembled state after attachment, the axial retention portions 61 and 61 and the ball 16 are configured not to be in contact with each other. That is, in the assembled state after attachment (see FIG. 3), when the cage 18 is displaced toward the one side in the axial direction, before the axial retention portions 61 and 61 are in contact with the ball 16, the guide portion 56 is in contact with the outer raceway surface 26, and the axial retention portions 61 and 61 are not in contact with the ball 16. Therefore, in the assembled state after attachment, the "bearing ring guide cage 18" is used as described above instead of the "ball guide cage".

Further, in FIG. 2, the outer radial retention portions 62 are in contact with the ball 16 housed in the pocket 53 in the pre-attachment unit state, so that the ball 16 is prevented from falling radially outward off the pocket 53. The inner radial retention portions 63 are in contact with the ball 16 housed in the pocket 53 in the pre-attachment unit state, so that the ball 16 is prevented from falling radially inward off the pocket 53.

In the pre-attachment unit state, in order to prevent the ball 16 from falling off, the ball 16 can be in contact with the outer radial retention portions 62 and 62, and the ball 16 can be in contact with the inner radial retention portions 63 and 63. On the contrary, in the assembled state after attachment, the outer radial retention portions 62 and 62 are not in contact with the ball 16, and the inner radial retention portions 63 and 63 are not in contact with the ball 16.

That is, in the assembled state after attachment, when the cage 18 is displaced radially outward (inward), before the radial retention portions 62 and 62 (63 and 63) are in contact with the ball 16, the guide portion 56 is in contact with the outer raceway surface 26, and the radial retention portions 62 and 62 (63 and 63) are not in contact with the ball 16. Therefore, in the assembled state after attachment, the "bearing ring guide cage 18" is used as described above instead of the "ball guide cage".

[Bearing Apparatus 10 of Present Disclosure]

As described above, as shown in FIG. 1, the bearing apparatus 10 of the present disclosure is configured to include the angular ball bearings in which the balls 16 have a contact angle and are in contact with the outer ring 12 and the inner shaft member 14, on the one side in the axial direction and the other side in the axial direction, respectively. In each of the cages 18 on the one side in the axial direction and the other side in the axial direction (see FIGS. 4 and 5), each of the pillar portions 52 includes the first flat surface portion 75a on the one side in the circumferential direction and the second flat surface portion 75b on the other side in the circumferential direction. The first flat surface portion 75a can be in contact with the balls 16 on the one side in the circumferential direction in the circumferential direction, and the second flat surface portion 75b can be in contact with the balls 16 on the other side in the circumferential direction in the circumferential direction. Then, the first flat surface portion 75a and the second flat surface portion 75b are parallel to each other.

Even when the cage 18 is displaced in the radial direction (the direction toward an upper right side in FIG. 5), the portion (the intermediate portion 72) of the pillar portion 52 between the first flat surface portion 75a and the second flat surface portion 75b can be in contact with the ball 16. That is, the ball 16 is not in contact with the pillar portion 52 at the extremely thin portion. The pillar portion 52 is not thinner than the portion (the intermediate portion 72) between the first flat surface portion 75a and the second flat surface portion 75b, and a thickness of a thinnest portion of the pillar portion 52 is secured. In the pillar portion 52, the intermediate portion 72 that is a contact portion with the ball 16 is a portion having a smallest dimension in the circumferential direction, but the portion (the intermediate portion 72) can be made as thick as possible.

According to the cage 18 provided in the bearing apparatus 10 of the present disclosure, as described above, in the pillar portion 52, the first flat surface portion 75a and the second flat surface portion 75b that are in contact with the ball 16 are flat surfaces, and are parallel to each other. Accordingly, while a contact state between the ball 16 and the pillar portion 52 is defined as point contact, the thickness of the thinnest portion of the pillar portion 52 can be increased.

Particularly, since a large load acts on the bearing apparatus 10 for a wheel from the vehicle body side, a road surface side, and the like, the number of balls 16 is larger than that of a general-purpose ball bearing. Therefore, an interval between the balls 16 and 16 adjacent to each other in the circumferential direction is narrow, and the pillar portion 52 is thin accordingly. However, according to the present disclosure, since the portion in contact with the ball 16 is the portion (the intermediate portion 72) between the first flat surface portion 75a and the second flat surface portion 75b that are parallel to each other, the portion in contact with the ball 16 in the pillar portion 52 is not extremely thin.

In the present disclosure (see FIGS. 4 and 5), the pillar portion 52 provided in the cage 18 includes the intermediate portion 72, the outer portion 73, and the inner portion 71. The intermediate portion 72 is a portion between the first flat surface portion 75a and the second flat surface portion 75b. The inner portion 71 is a portion provided radially inward of the intermediate portion 72, and has a dimension in the circumferential direction larger than that of the intermediate portion 72. The outer portion 73 is a portion provided radially outward of the intermediate portion 72, and has a dimension in the circumferential direction larger than that of the intermediate portion 72. With this configuration, a thickness of the pillar portion 52 is further increased at the portions on the radially outer side and the radially inner side from the intermediate portion 72 (the outer portion 73 and the inner portion 71), and a strength of the pillar portion 52 is increased.

In the present disclosure (see FIG. 5), the pillar portion 52 includes the inner portion 71 and the outer portion 73 in addition to the intermediate portion 72, and the radially inner side and the radially outer side of the pillar portion 52 have a dimension in the circumferential direction (thickness) larger than that of the intermediate portion 72. However, although not shown, one of the inner portion 71 and the outer portion 73 of the pillar portion 52 may have the same dimension in the circumferential direction (thickness) as that of the pillar portion 52.

As described above (see FIG. 5), in the present disclosure, in each pillar portion 52, the gap e3 in the circumferential direction formed between the outer portion 73 and the ball 16 and the gap e1 in the circumferential direction formed between the inner portion 71 and the ball 16 are larger than the gap e2 in the circumferential direction formed between the intermediate portion 72 and the ball 16. With this configuration, the ball 16 can be reliably in point contact with the first flat surface portion 75a (the second flat surface portion 75b) of the intermediate portion 72. The ball 16 is in point contact with the first flat surface portion 75a (the second flat surface portion 75b), so that a contact area between the pillar portion 52 and the ball 16 approaches zero. That is, an area of a surface where grease is sheared between the pillar portion 52 and the ball 16 (hereinafter, referred to as "shear area") becomes as small as possible. Therefore, a shear resistance of the grease can be reduced.

Further, the bearing apparatus 10 of the present disclosure is configured as follows.

Each pocket 53 (see FIGS. 2 and 3) includes the inner contact surface portion 54 and the inner non-contact surface portion 55. In FIG. 3, when the cage 18 is displaced toward the other side in the axial direction, the inner contact surface portion 54 is in point contact with the ball 16 at the point Q on the rotation center line L3 of the ball 16. The inner non-contact surface portion 55 is a surface provided adjacent to the inner contact surface portion 54, and cannot be in contact with the ball 16 even when the cage 18 is displaced in the other side in the axial direction.

According to the bearing apparatus 10, when the cage 18 is displaced toward the other side in the axial direction, the inner contact surface portion 54 and the ball 16 are in point contact with each other. Therefore, a contact area between the pocket 53 and the ball 16 approaches zero. That is, an area of a surface where the grease is sheared (a shear area of the grease) between the pocket 53 and the ball 16 becomes as small as possible. Therefore, a shear resistance of the grease can be reduced.

In addition, the ball 16 is in point contact with the inner contact surface portion 54 at the point Q on the rotation center line L3. At the point contact position, a relative speed (sliding speed) between the pocket 53 and the ball 16 approaches zero. Therefore, it is possible to further reduce the shear resistance of the grease at the point Q at which the ball 16 and the pocket 53 are in contact with each other.

Then, in the pocket 53, the inner non-contact surface portion 55 provided adjacent to the inner contact surface portion 54 cannot be in contact with the ball 16. Accordingly, a wide clearance (E2) is generated between the inner non-contact surface portion 55 and the ball 16. Because of the wide clearance (E2), the grease is unlikely to be sheared between the inner non-contact surface portion 55 and the ball 16, and a rotational resistance is reduced.

In the bearing apparatus 10 of the present disclosure, the cage 18 includes the guide portion 56 (see FIG. 6). The guide portion 56 can be in contact with the outer raceway surface 26, which is a part of the outer ring 12, from the radial direction, and can position the cage 18 in the radial direction by the contact. That is, in the bearing apparatus 10 of the present disclosure, the cage 18 is the "bearing ring guide cage".

Here, although not shown, the cage positioned in the radial direction by being in contact with the ball is referred to as the "ball guide cage". In a case of the ball guide cage, a rotational speed of the ball with respect to the pocket of the cage is high, the relative speed (sliding speed) between the two is high, and the grease is likely to be sheared.

However, in a case of the bearing ring guide cage 18 as in the present disclosure, the cage 18 is positioned in contact with the outer ring 12. A relative speed difference between the outer ring 12 and the cage 18 is smaller than a relative speed difference between the pocket 53 and the ball 16 (the rotational speed of the ball 16 with respect to the pocket 53). Therefore, in the bearing ring guide cage 18, the grease is unlikely to be sheared than in the ball guide cage. That is, according to the guide portion 56 of the present disclosure, it is possible to reduce the rotational resistance because of shearing of the grease.

As described above, the guide portion 56 functions not only for positioning the cage 18 in the radial direction but also for positioning the cage 18 in the axial direction. That is, when the cage 18 is displaced toward the one side in the axial direction, the guide portion 56 is in contact with the outer raceway surface 26 from the axial direction, so that the displacement is restricted. In the present disclosure, when the cage 18 is displaced toward the other side in the axial direction, the inner contact surface portion 54 is in point contact with the ball 16, so that the displacement is restricted.

As described above, the positioning of the cage 18 displaced toward the one side in the axial direction is performed by the guide portion 56 in contact with the outer raceway surface 26. Since the relative speed difference between the guide portion 56 (the cage 18) and the outer ring 12 is small as described above, the grease is unlikely to be sheared. Then, the positioning of the cage 18 displaced toward the other side in the axial direction is performed by the inner contact surface portion 54 (see FIG. 3). The inner contact surface portion 54 is in contact with the ball 16, and the contact mode is the point contact. Therefore, the shear area of the grease is reduced. Further, the inner contact surface portion 54 and the ball 16 are in point contact with each other at the point Q on the rotation center line L3 of the ball 16. At the point Q, since the relative speed (sliding speed) between the inner contact surface portion 54 and the ball 16 approaches zero, the shear resistance of the grease is reduced.

[Others]

The above description of the cage 18 is description of the cage 18 on the other side in the axial direction of the bearing apparatus 10 shown in FIG. 1. As described above, the cage 18 on the one side in the axial direction and the cage 18 on the other side in the axial direction are attached in opposite directions in the axial direction, but have the same configuration. Therefore, when the above description related to the cage 18 on the other side in the axial direction is applied to the cage 18 on the one side in the axial direction, the one side and the other side in the axial direction may be replaced with each other.

As described in the above embodiment, the present disclosure relates to a wheel bearing apparatus 10 used in the automobile. However, a portion of the angular ball bearing constituted by the plurality of balls 16, the outer raceway surface 26, and the shaft raceway surface 42 (or the inner ring raceway surface 44) in the wheel bearing apparatus 10 may be applied to other rotating machines. Alternatively, the portion of the angular ball bearing configured as described above may be applied to a general (general-purpose) angular ball bearing. Similarly, in these angular ball bearings, the grease is unlikely to be sheared, and the rotational resistance is reduced.

The above-described embodiment is illustrative and not restrictive in all respects. The scope of the present disclosure is not limited to the embodiment described above, and all modifications within the scope equivalent to the configurations described in the claims are included in the scope of the present disclosure.

This application is based on Japanese Patent Application No. 2019-189532 filed on Oct. 16, 2019, Japanese Patent Application No. 2019-112093 filed on Jun. 17, 2019, and Japanese Patent Application No. 2019-129115 filed on Jul. 11, 2019, the contents of which are incorporated herein by reference.

The invention claimed is:

1. An angular ball bearing comprising:
an outer member;
an inner member;
a plurality of balls arranged between the outer member and the inner member; and
a cage configured to hold the plurality of balls,
wherein a virtual straight line that passes through a first contact point between the balls and the outer member and a second contact point between the balls and the inner member is inclined with respect to a virtual plane that is orthogonal to a bearing center line of at least one of the inner member and the outer member and that passes through a center of the balls,
wherein the cage comprises:
an annular portion positioned on one side of the cage in an axial direction of the angular ball bearing with respect to the balls; and
a plurality of pillar portions provided to extend from the annular portion to the other side of the cage in the axial direction, and
wherein each pillar portion comprises:
a first flat surface portion contactable with a respective one of the balls on one side of the pillar portion in a circumferential direction of the angular ball bearing;
a second flat surface portion contactable with another respective one of the balls on the other side of the pillar portion in the circumferential direction and parallel to the first flat surface portion;
an intermediate portion between the first flat surface portion and the second flat surface portion;
an outer portion provided radially outward from the intermediate portion and having a dimension in the circumferential direction larger than that of the intermediate portion; and
an inner portion provided radially inward from the intermediate portion and having a dimension in the circumferential direction larger than that of the intermediate portion.

2. The angular ball bearing according to claim 1,
wherein the first flat surface portion and the second flat surface portion of the pillar portions are each orthogonal to a virtual line that connects centers of the balls positioned on both sides of the pillar portions in the circumferential direction.

3. The angular ball bearing according to claim 1,
wherein a gap in the circumferential direction formed between the outer portion and the balls and a gap in the circumferential direction formed between the inner portion and the balls are larger than a gap in the circumferential direction formed between the intermediate portion and the balls.

4. A wheel bearing apparatus comprising:
an outer member;
an inner member;
a plurality of balls arranged between the outer member and the inner member; and
a cage configured to hold the plurality of balls,
wherein a virtual straight line that passes through a first contact point between the balls and the outer member and a second contact point between the balls and the inner member is inclined with respect to a virtual plane that is orthogonal to a bearing center line of at least one of the inner member and the outer member and that passes through a center of the balls,
wherein the cage comprises:
an annular portion positioned on one side of the cage in an axial direction of the wheel bearing apparatus with respect to the balls; and
a plurality of pillar portions provided to extend from the annular portion to the other side of the cage in the axial direction, and
wherein each pillar portion comprises:
a first flat surface portion contactable with a respective one of the balls on one side of the pillar portion in a circumferential direction of the wheel bearing apparatus, and
a second flat surface portion contactable with another respective one of the balls on the other side of the pillar portion in the circumferential direction and parallel to the first flat surface portion;
an intermediate portion between the first flat surface portion and the second flat surface portion;
an outer portion provided radially outward from the intermediate portion and having a dimension in the circumferential direction larger than that of the intermediate portion; and
an inner portion provided radially inward from the intermediate portion and having a dimension in the circumferential direction larger than that of the intermediate portion.

* * * * *